(12) United States Patent
Suh

(10) Patent No.: US 7,893,918 B2
(45) Date of Patent: Feb. 22, 2011

(54) ELECTROPHORETIC DISPLAY APPARATUS AND MANUFACTURING METHOD THEREOF

(75) Inventor: Min-Chul Suh, Suwon-si (KR)

(73) Assignee: Samsung Mobile Display Co., Ltd., Yongin-si (KR)

( * ) Notice: Subject to any disclaimer, the term of this patent is extended or adjusted under 35 U.S.C. 154(b) by 947 days.

(21) Appl. No.: 11/736,138

(22) Filed: Apr. 17, 2007

(65) Prior Publication Data

US 2008/0165121 A1 Jul. 10, 2008

(30) Foreign Application Priority Data

Jan. 9, 2007 (KR) .................. 10-2007-0002660

(51) Int. Cl.
*G09G 3/34* (2006.01)

(52) U.S. Cl. ..................................... 345/107

(58) Field of Classification Search .................. 345/33, 345/45, 87, 107, 156, 169, 173; 359/321, 359/296; 349/121, 122, 158, 58; 257/59, 257/40, 379, 763

See application file for complete search history.

(56) References Cited

U.S. PATENT DOCUMENTS

| 6,031,594 | A  | * | 2/2000 | Engle ........................... 349/158 |
| 6,376,828 | B1 | * | 4/2002 | Comiskey .................... 250/216 |
| 6,525,865 | B2 | * | 2/2003 | Katase ......................... 359/296 |
| 6,947,203 | B2 | * | 9/2005 | Kanbe .......................... 359/296 |
| 7,038,833 | B1 | * | 5/2006 | Liu et al. ..................... 359/296 |
| 7,108,949 | B2 |   | 9/2006 | Kim et al. |
| 7,301,524 | B2 | * | 11/2007 | Kawai ......................... 345/107 |
| 7,388,631 | B2 | * | 6/2008 | Freeman ..................... 349/110 |
| 7,459,176 | B2 | * | 12/2008 | Sakurada ..................... 427/58 |
| 7,551,345 | B2 | * | 6/2009 | Uchida ........................ 359/296 |
| 7,572,667 | B2 | * | 8/2009 | Ryu et al. ..................... 438/99 |
| 7,646,012 | B2 | * | 1/2010 | Kim et al. ..................... 257/40 |
| 2002/0008898 | A1 | * | 1/2002 | Katase ......................... 359/296 |
| 2002/0050976 | A1 |   | 5/2002 | Yamaguchi et al. |
| 2002/0105600 | A1 |   | 8/2002 | Shimoda et al. |
| 2003/0095094 | A1 | * | 5/2003 | Goden ......................... 345/107 |
| 2004/0017349 | A1 | * | 1/2004 | Kawai ......................... 345/107 |
| 2004/0070706 | A1 | * | 4/2004 | Freeman ..................... 349/110 |
| 2004/0180275 | A1 |   | 9/2004 | Kim et al. |
| 2005/0024710 | A1 | * | 2/2005 | Kanbe .......................... 359/296 |
| 2005/0205999 | A1 | * | 9/2005 | Forbes et al. ................ 257/753 |
| 2005/0263903 | A1 | * | 12/2005 | Forbes et al. ................ 257/763 |

(Continued)

FOREIGN PATENT DOCUMENTS

JP 2-59788 2/1990

(Continued)

OTHER PUBLICATIONS

Office Action issued in corresponding Korean Patent Application No. 2007-0002660 dated Dec. 6, 2007.

(Continued)

*Primary Examiner*—Prabodh M Dharia
(74) *Attorney, Agent, or Firm*—Stein McEwen, LLP

(57) ABSTRACT

An electrophoretic display apparatus includes a first substrate including a thin film transistor, a second substrate attached to the first substrate and including electrophoretic particles and an electrophoretic dispersion medium, and a third substrate attached to the second substrate and including a color filter.

5 Claims, 7 Drawing Sheets

U.S. PATENT DOCUMENTS

| | | | |
|---|---|---|---|
| 2006/0062975 A1* | 3/2006 | Majumdar et al. | 428/209 |
| 2006/0062983 A1* | 3/2006 | Irvin et al. | 428/220 |
| 2006/0132461 A1* | 6/2006 | Furukawa et al. | 345/173 |
| 2006/0279525 A1* | 12/2006 | Matsuda | 345/107 |

FOREIGN PATENT DOCUMENTS

| | | |
|---|---|---|
| JP | 7-77687 | 3/1995 |
| JP | 11-14979 | 1/1999 |
| JP | 2002-540591 | 11/2002 |
| JP | 2004-62040 | 2/2004 |
| KR | 2001-111830 | 12/2001 |
| KR | 2003-34820 | 5/2003 |
| KR | 2004-53848 | 6/2004 |
| KR | 2005-68794 | 7/2005 |
| KR | 2006-111244 | 10/2006 |
| WO | WO 2007/063440 | 6/2007 |

OTHER PUBLICATIONS

European Search Report issued in European Patent Application No. 07 25 2532 on May 20, 2008.

Korean Office Action issued in Korean Patent Application No. 2007-2660 on Jun. 17, 2008.

Japanese Office Action issued in Jun. 1, 2010.

Chinese Office Action dated Oct. 8, 2010, issued in corresponding Chinese Patent Application No. 200710109283.3.

US Patent Publication No. 2002/0008898, cited in the Chinese Office Action (AM), was previously cited by the Examiner in the US Office Action dated Mar. 25, 2010.

US Patent Publication No. 2006/0132461, cited in the Chinese Office Action (AM), was previously cited by the Examiner in the US Office Action dated Mar. 25, 2010.

US Patent Publication No. 2004/0017349, cited in the Chinese Office Action (AM), was previously cited by the Examiner in the US Office Action dated Aug. 3, 2010.

* cited by examiner

ELECTROPHORETIC DISPLAY APPARATUS AND MANUFACTURING METHOD THEREOF

CROSS-REFERENCE TO RELATED APPLICATIONS

This application claims the benefit of Korean Application No. 2007-2660, filed Jan. 9, 2007, in the Korean Intellectual Property Office, the disclosure of which is incorporated herein by reference.

BACKGROUND OF THE INVENTION

1. Field of the Invention

Aspects of the present invention relate to an electrophoretic display apparatus and a method of manufacturing the electrophoretic display apparatus. More particularly aspects of the present invention relate to an electrophoretic display apparatus that can provide a full color display using a color filter layer and a method of manufacturing the electrophoretic display apparatus.

2. Description of the Related Art

An electrophoretic display apparatus is a display apparatus that uses electrophoresis. That is, the display apparatus uses electrically charged pigment particles that are dispersed in a suspension and that are moved by an electric field in order to display a desired image. The electrophoretic display apparatus may be classified as a next generation display apparatus since the electrophoretic display apparatus has advantages over current generation display apparatuses including wide viewing angles, high reflectance, easy readability, low power consumption, flexibility, and the like.

However, since an electrophoretic display apparatus relies upon the properties of the pigment particles, that is, the reflection or interception of light by the pigment particles, a conventional electrophoretic display apparatus by itself typically cannot provide a full color display but instead is only monocolor. Accordingly, the electrophoretic display apparatus has typically been used only as e-paper, electric newspapers, or the like.

SUMMARY OF THE INVENTION

Aspects of the present invention provide an electrophoretic display apparatus that can simply realize a full color display.

Aspects of the present invention also provide a method of manufacturing the electrophoretic display apparatus simply and inexpensively such that the productivity and productive yield of the manufacturing can be improved.

According to an aspect of the present invention, there is provided an electrophoretic display apparatus including a first substrate including a thin film transistor; a second substrate attached to the first substrate and including electrophoretic particles and an electrophoretic dispersion medium; and a third substrate attached to the second substrate and including a color filter.

According to an aspect of the present invention the first substrate of the electrophoretic display apparatus may further include a pixel electrode electrically connected to the thin film transistor and disposed to face the second substrate.

According to an aspect of the present invention, the second substrate may include a common electrode facing the pixel electrode, and the electrophoretic particles and the electrophoretic dispersion medium may be interposed between the pixel electrode and the common electrode.

According to an aspect of the present invention, the thin film transistor may include an organic semiconductor layer.

According to an aspect of the present invention, the third substrate may include a substrate base and a color filter formed on one surface of the substrate base, and an adhesion layer may be interposed between the second substrate and the third substrate.

According to an aspect of the present invention, the substrate base may be flexible.

According to an aspect of the present invention, the color filter of the third substrate may be formed on one surface of the second substrate.

According to an aspect of the present invention, at least one of the first through third substrates may be flexible.

According to another aspect of the present invention, there is provided an electrophoretic display apparatus comprising a first substrate comprising a thin film transistor; a second substrate attached to the first substrate and comprising electrophoretic particles and an electrophoretic dispersion medium; and a color filter attached to the second substrate.

According to another aspect of the present invention, there is provided an electrophoretic display apparatus comprising a first substrate comprising a plurality of thin film transistors; a second substrate attached to the first substrate and comprising electrophoretic particles and an electrophoretic dispersion medium; wherein the first substrate further includes a plurality of pixel electrodes, each being electrically connected to a thin film transistor and facing the second substrate; and wherein the electrophoretic display apparatus further includes a plurality of color filters attached to a surface the second substrate, each color filter being aligned with a pixel electrode.

According to another aspect of the present invention, there is provided a method of manufacturing an electrophoretic display apparatus, including: preparing a first substrate including a thin film transistor; preparing a second substrate including electrophoretic particles and an electrophoretic dispersion medium; attaching a first surface of the second substrate to a surface of the first substrate; and attaching a third substrate including a color filter to a second surface of the second substrate.

According to an aspect of the present invention, the attaching of the third substrate may include: preparing the third substrate by forming a color filter on one surface of a substrate base; and attaching the substrate base to the second surface of the second substrate. The substrate base of the third substrate may be attached to the second surface of the second substrate by interposing an adhesion layer between the second substrate and the third substrate.

According to another aspect of the present invention, there is provided a method of manufacturing an electrophoretic display apparatus, comprising: preparing a first substrate comprising a thin film transistor; preparing a second substrate comprising electrophoretic particles and an electrophoretic dispersion medium; attaching a first surface of the second substrate to the first substrate; and forming a color filter on a second surface of the second substrate.

According to an aspect of the present invention, the forming of the color filter may include: preparing a donor substrate including a color filter material to be transcribed onto the second surface of the second substrate; aligning the donor substrate on the second surface of the second substrate; and transcribing the color filter material onto the second surface of the second substrate.

According to another aspect of the present invention, there is provided a method of manufacturing an electrophoretic display apparatus, including: preparing a first substrate comprising a plurality of thin film transistors; preparing a second substrate comprising electrophoretic particles and an electrophoretic dispersion medium; attaching a first surface of the second substrate to the first substrate; and forming a plurality of color filters on a second surface of the second substrate.

According to another aspect of the present invention, there is provided a method of manufacturing an electrophoretic display apparatus, including: preparing a first substrate including a thin film transistor; preparing a second substrate including electrophoretic particles and an electrophoretic dispersion medium; forming a color filter on a surface of the second substrate; and attaching the second substrate to a surface of the first substrate.

According to an aspect of the present invention, the forming of the color filter may include: preparing a donor substrate including a color filter material; aligning the donor substrate on the surface of the second substrate; and transcribing the color filter material onto the surface of the second substrate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
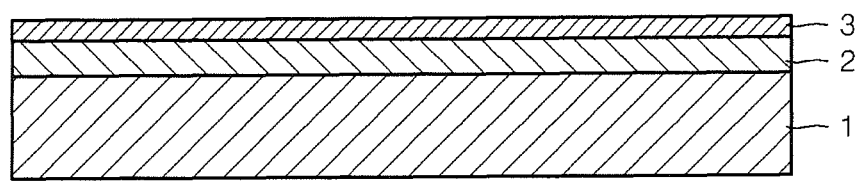
FIG. 1 is a schematic cross-sectional view illustrating an electrophoretic display apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. The invention may, however, be embodied in many different forms and should not be construed as being limited to the embodiments set forth herein; rather, these embodiments are provided so that this disclosure will be thorough and complete, and will fully convey the concept of the invention to those skilled in the art.

FIG. 1 is a schematic cross-sectional view illustrating an electrophoretic display apparatus according to an embodiment of the present invention.

Referring to FIG. 1, the electrophoretic display apparatus includes a first substrate 1 including a thin film transistor, a second substrate 2, which is formed on one surface of the first substrate 1 and includes electrophoretic particles and an electrophoretic dispersion media, and a third substrate 3, which is formed on one surface of the second substrate 2 and includes a color filter.

Figure 2:
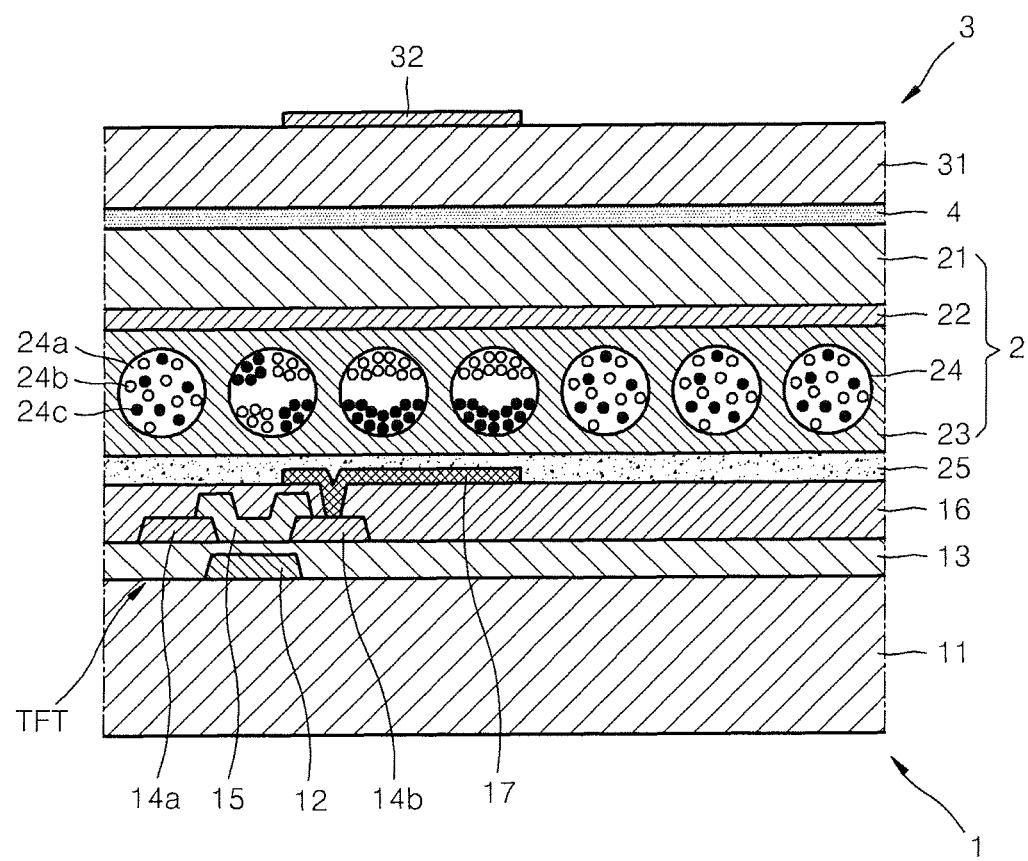
FIG. 2 is a detailed schematic cross-sectional view of the electrophoretic display apparatus of FIG. 1.

FIG. 2 is a detailed cross-sectional view of the electrophoretic display apparatus of FIG. 1. As shown in FIG. 2, the first substrate 1 includes a first substrate base 11 and a thin film transistor TFT formed on the first substrate base 11.

The first substrate base 11 may be transparent or opaque. As non-limiting examples, the first substrate base 11 may be formed of glass, plastic or metal foil. The first substrate base 11 may also be formed of a flexible material such as, for example, plastic.

As shown in FIG. 2, the TFT can be a bottom gate type thin film transistor. For the bottom gate TFT, a gate electrode 12 is formed on one surface of the first substrate base 11. The gate electrode 12 may be formed of metal to have a single layer or a plurality of layers. Alternatively, the gate electrode 12 may be formed of polymer paste, conductive polymer material or the like in which metal powder is mixed.

A gate insulating layer 13 is formed to cover the gate electrode 12. The gate insulating layer 13 may be formed to have a single layer or a plurality of layers. The gate insulating layer 13 may be formed of organic material, inorganic material, or an organic/inorganic composite. When the gate insulating layer 13 is used in a flexible display device, the gate insulating layer 13 may be formed of a flexible material that includes an organic material.

A source electrode 14a and a drain electrode 14b are formed on the gate insulating layer 13. The source electrode 14a and the drain electrode 14b may be formed of metal to each have a single layer or a plurality of layers. For example, the source electrode 14a and the drain electrode 14b may be formed of Al, Mo, Au, Ag, Pt/Pd, Cu, or the like. Alternatively, the source electrode 14a and the drain electrode 14b may be formed by coating a resin paste or conductive polymer material including a metal powder on the gate insulating layer 13.

An active layer 15 is formed between the source electrode 14a and the drain electrode 14b formed on the on the gate insulating layer 13 to come in contact with the source electrode 14a and the drain electrode 14b.

The active layer 15 may be formed of an organic or inorganic semiconductor material. When the active layer 15 is used in a flexible display device, the active layer 15 may be formed of a flexible organic semiconductor material.

The active layer 15 may be formed of an organic semiconductor material such as pentacene, tetracene, anthracene, naphthalene, alpha-6-thiophene, alpha-4-thiophen, perylene and derivatives thereof, rubrene and derivatives thereof, coronene and derivatives thereof, perylene tetracarboxylic diimide and derivatives thereof, perylene tetracarboxylic dianhydride and derivatives thereof, oligonaphthalene and derivatives thereof, oligothiophene of α-5-thiophene and derivatives thereof, metal-containing or metal-free phthalocyanine and derivatives thereof, naphthalene tetracarboxylic diimide and derivatives thereof, naphthalene tetracarboxylic dianhydride and derivatives thereof, pyromellitic dianhydride and derivatives thereof, pyromellitic diimide and derivatives thereof, conjugated system high molecular compound including thiophene and derivatives thereof, and a high molecular compound including fluorine and derivatives thereof, or the like.

The inorganic semiconductor material may be amorphous silicon, poly silicon, germanium, or the like.

Although a bottom gate type thin film transistor is shown in FIG. 2, the TFT of the electrophoretic display apparatus is not limited thereto. The TFT can be any type of thin film transistor that delivers an electrical signal to a pixel electrode. As non-limiting examples, the TFT may be a bottom gate type thin film transistor such as shown in FIG. 2 or may be a top gate type thin film transistor including a gate electrode formed on an active layer.

After forming the thin film transistor TFT, an insulating layer 16 is formed to cover the thin film transistor TFT. Then, a pixel electrode 17 is formed on the insulating layer 16. The pixel electrode 17 is formed so that the pixel electrode 17 comes into contact with the drain electrode 14b of the thin film transistor through a via hole formed through the insulating layer 16.

Next, the second substrate 2 is formed to include an electrophoretic layer 23.

That is, the second substrate 2 includes a second substrate base 21, a common electrode 22 and the electrophoretic layer 23. The common electrode 22 is formed on the second substrate base 21, and the electrophoretic layer 23 is formed on the common electrode 22.

The second substrate base 21 may be opaque or transparent. For example, the second substrate base 21 may be a glass or plastic substrate. The common electrode 22 may be formed of a transparent conductive material such as, for example, ITO, IZO, $In_2O_3$, ZnO, or the like.

The electrophoretic layer 23 includes an electrophoretic material which, as a non-limiting example, may be in the form of a plurality of electrophoretic balls 24.

In each of the electrophoretic balls 24, a plurality of first and second electrophoretic dispersion particles 24b and 24c having different colors from each other are dispersed in an electrophoretic dispersion medium 24a. The first electrophoretic dispersion particles 24b and the second electrophoretic dispersion particles 24c are electrically charged so as to have different polarities from each other. Accordingly, as illustrated in FIG. 2, when a voltage is applied between the common electrode 22 and the pixel electrode 17 so that a potential difference is provided between the common electrode 22 and the pixel electrode 17, the first electrophoretic dispersion particles 24b and the second electrophoretic dispersion particles 24c are attracted towards and move towards the common electrode 22 and the pixel electrode 17 respectively, which allows the electrophoretic display apparatus to display a predetermined image.

The structure of the electrophoretic layer 23 is not limited to that of FIG. 2. It is to be understood by those of ordinary skill in the art that various changes in form may be included. For example, instead of using electrophoretic balls 24 as shown in FIG. 2, a partition wall structure may be formed in the electrophoretic layer 23 to restrict the lateral mobility of the electrophoretic particles in the electrophoretic dispersion medium.

The second substrate 2 may be attached onto the first substrate 1 by interposing an additional adhesion layer 25.

As illustrated in FIG. 2, the pixel electrode 17 is formed on the first substrate 1. Alternatively, the pixel electrode 17 may be formed on the surface of the second substrate 2 that faces the first substrate 1. After forming a contact (not shown) connected to the thin film transistor TFT on the first substrate 1, the first substrate 1 and the second substrate 2 may then be attached so that the contact and the pixel electrode 17 are connected.

The second substrate base 21 of the second substrate 2 may be attached onto the third substrate 3 by interposing an adhesion layer 4.

The third substrate 3 includes a third substrate base 31 formed of transparent material and a color filter 32 formed on the third substrate base 31. The third substrate base 31 may be glass or plastic. As a non-limiting example, the third substrate base 31 may be a flexible plastic.

Figure 3A:
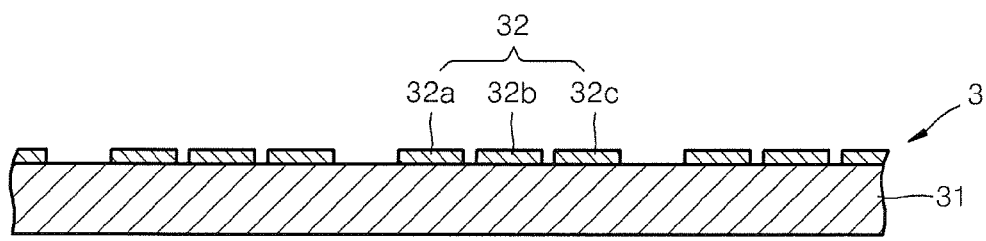
FIG. 3A through 3C are schematic cross-sectional views illustrating operations included in a method of manufacturing the electrophoretic display apparatus of FIG. 2, according to an embodiment of the present invention.
Figure 3B:
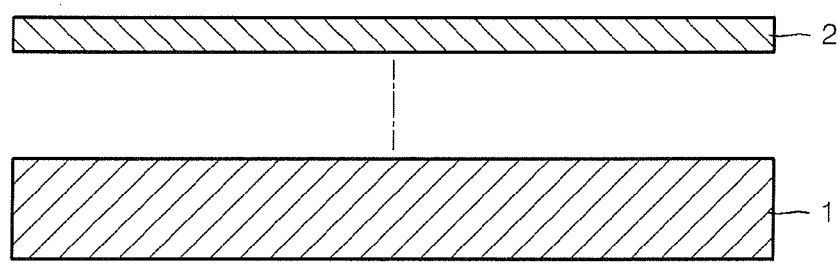
Figure 3C:
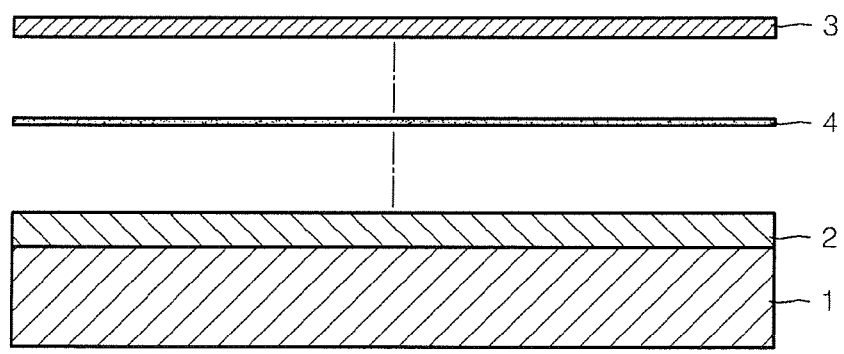

FIG. 3A through 3C are cross-sectional views illustrating operations included in a method of manufacturing the electrophoretic display apparatus of FIG. 2, according to an embodiment of the present invention.

Referring to FIG. 3A, the third substrate 3 is provided to include color filters 32 formed on the third substrate base 31, which is formed of transparent material. Each color filter 32 may be a red filter 32a, a green filter 32b, or a blue filter 32c, such that the light transmitted by the electrophoretic display apparatus can embody white light. It is to be understood that while color filters 32a, 32b and 32c are referred to as red, green and blue, respectively, other colors and other color filter material may be used.

Next, referring to FIG. 3B, the first substrate 1 and the second substrate 2, which are previously prepared, are connected to each other. The structures of the first substrate 1 and the second substrate 2 are the same as those of FIG. 2. The first substrate 1 may be attached to the second substrate 2 by interposing an adhesion layer, such as the adhesion layer 25 of FIG. 2.

Referring to FIG. 3C, the third substrate 3 is attached to the second substrate 2 by interposing the adhesion layer 4.

The red, green and blue filters 32a, 32b and 32c of the third substrate 3 should be aligned to each correspond to a pixel electrode 17 as illustrated in FIG. 2. Herein, the term "aligned" refers to a positioning of the color filter 32 such that light that interacts with electrophoretic particles 24b and 24c electrically charged by a pixel electrode 17 also interacts with the color filter 32 so that color is perceived. In an electrophoretic display apparatus having a plurality of TFTs and corresponding pixel electrodes 17, in order to control the image and color of light perceived from the electrophoretic display apparatus, each color filter 32, which can be a red filter 32a, a green filter 32b or a blue filter 33c, can be aligned with only one pixel electrode 17.

The connection order of the first substrate 1, the second substrate 2 and the third substrate 3 is interchangeable. That is, the second substrate 2 may first be attached to the third substrate 3, and then the second substrate 2 may be attached to the first substrate 1.

After forming the third substrate 3 including the color filter 32, the third substrate 3 is attached to the second substrate 2 including the electrophoretic layer 23 to manufacture a electrophoretic display apparatus which can be used to embody a full color display.

Figure 4:
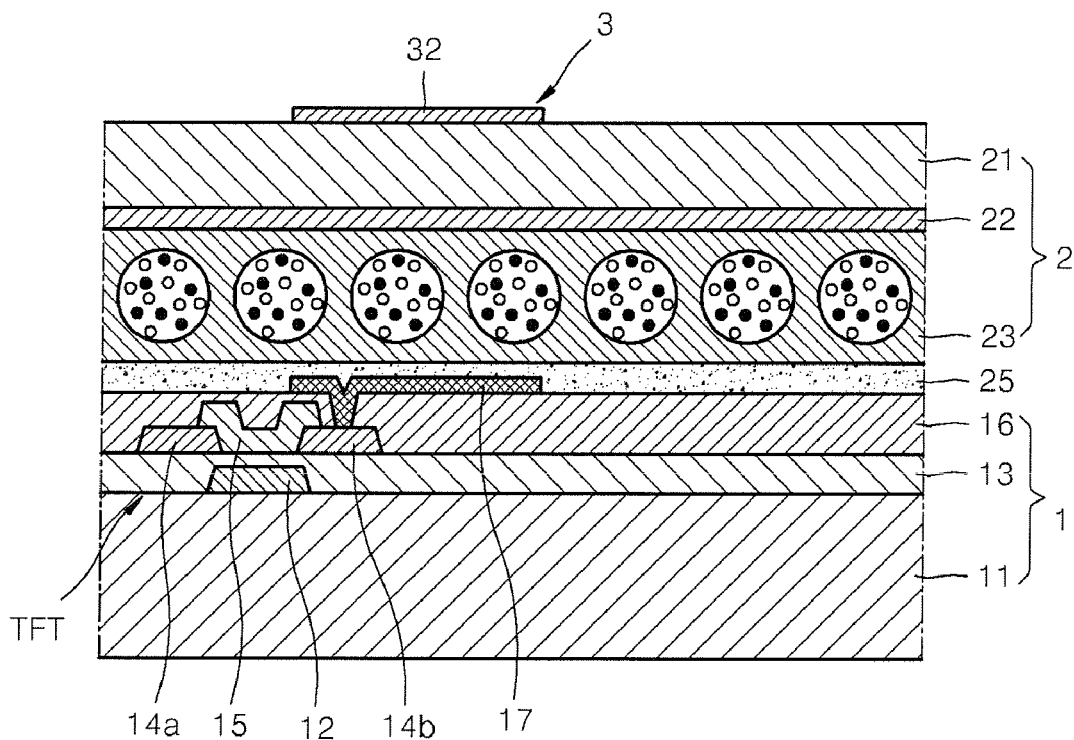
FIG. 4 is a schematic cross-sectional view illustrating an electrophoretic display apparatus according to another embodiment of the present invention.

FIG. 4 is a cross-sectional view illustrating an electrophoretic display apparatus according to another embodiment of the present invention.

Referring to FIG. 4, the color filter 32 may be formed directly on the second substrate base 21 of the second substrate 2 and the third substrate may be omitted.

In this embodiment, since there is no third substrate, brightness of the electrophoretic display apparatus can be increased. In addition, with this embodiment, alignment of each of the red, green and blue filters 32a, 32b and 32c with pixel electrodes 17 is easier, so productivity can be improved.

FIG. 5A through 5D are cross-sectional views illustrating operations included in a method of manufacturing the electrophoretic display apparatus of FIG. 4.

Figure 5A:
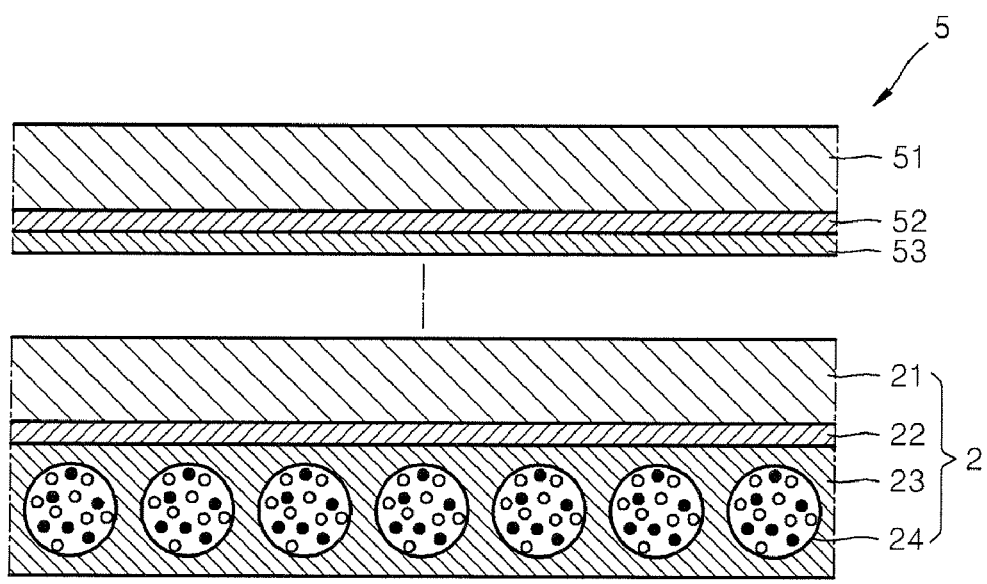
FIG. 5A through 5D are schematic cross-sectional views illustrating operations included in a method of manufacturing the electrophoretic display apparatus of FIG. 4, according to another embodiment of the present invention.

First, referring to FIG. 5A, a donor substrate 5 is prepared.

The donor substrate 5 is manufactured by forming a light-to-heat conversion (LTHC) layer 52 on a donor substrate base 51, and then forming a color filter layer 53 on the LTHC layer 52.

Next, the color filter layer 53 is arranged so as to face towards the second substrate base 21 of the second substrate 2.

Figure 5B:
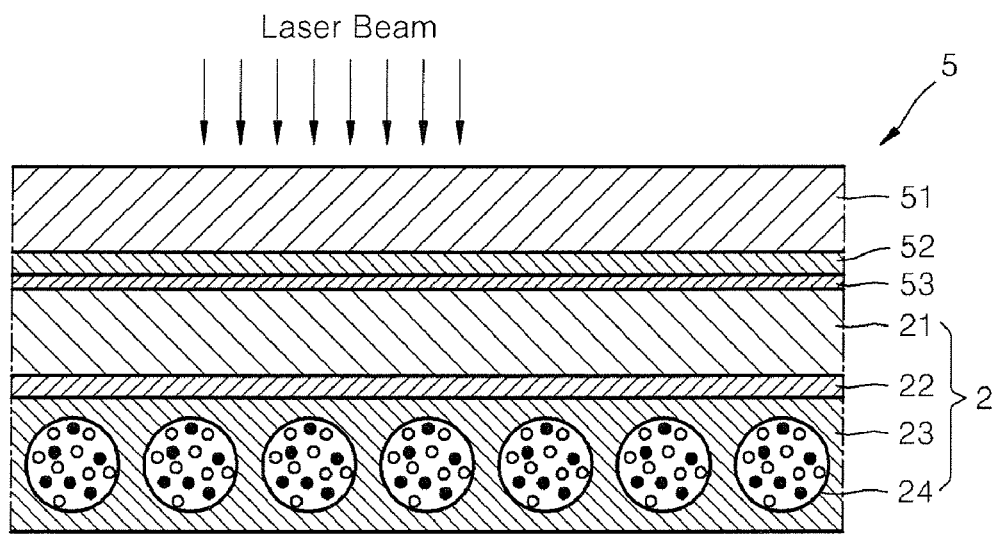

Referring to FIG. 5B, a laser is irradiated on a region of the donor substrate 5 corresponding to a pixel. For example, the laser may be irradiated on a region of the donor substrate 5 that will be aligned with a pixel electrode 17 when the electrophoretic display apparatus is fully manufactured. Light energy of the laser is converted to heat energy by the LTHC layer 52 to transcribe the color filter layer 53 onto the second substrate base 21. For forming a plurality of color filters 32 on regions corresponding to pixels, the laser is controlled to selectively irradiate each region where a color filter is to be formed.

Figure 5C:
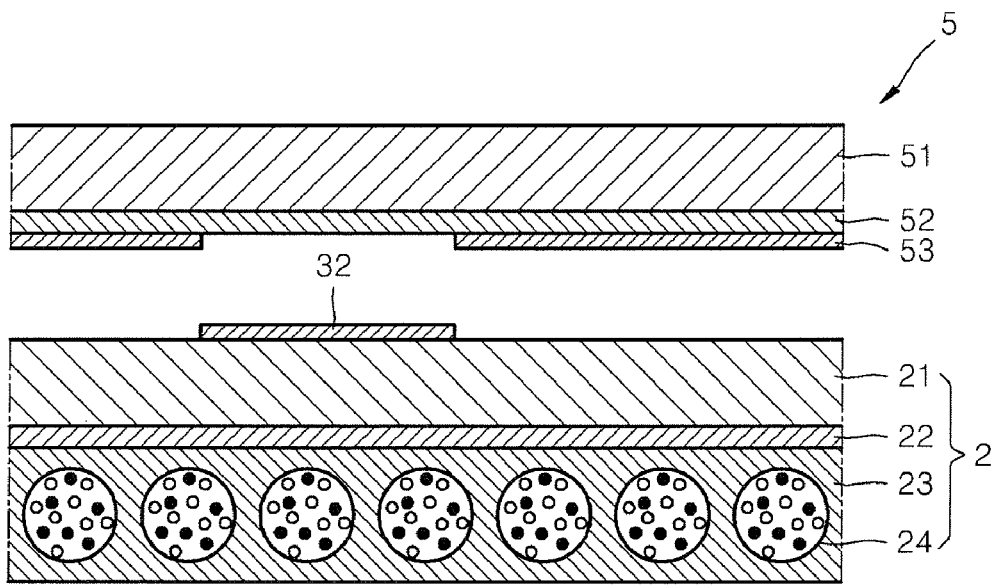

Referring to FIG. 5C, the donor substrate 5 is removed and the color filter 32 formed by transcription of the color filter layer 53 remains on the second substrate base 21.

Figure 5D:
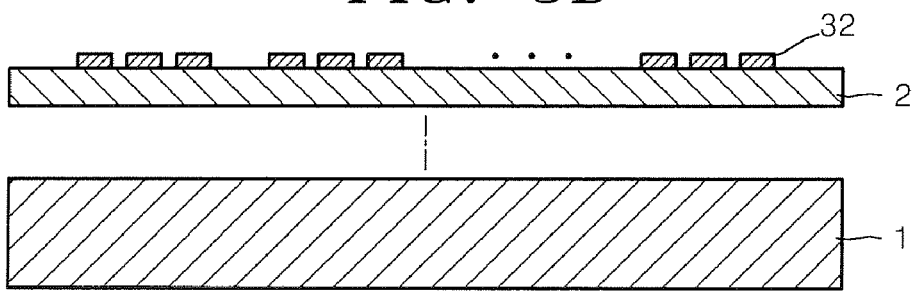

Next, referring to FIG. 5D, the second substrate 2, on which a plurality of color filters 32 are formed, and the first substrate 1, on which the thin film transistor is formed, are aligned and attached to each other. In the aligning, the color filters 32 are aligned with corresponding pixel electrodes 17.

When the method illustrated in FIG. 5A through 5D is used, since the color filters 32 are formed directly on the second substrate 21, the thickness of the electrophoretic display apparatus can be decreased to increase the brightness of the electrophoretic display apparatus. In addition, since just one aligning operation is used, the productivity of forming the electrophoretic display apparatus can be improved.

FIG. 6A through 6D are cross-sectional views illustrating operations included in a method of manufacturing the electrophoretic display apparatus of FIG. 4, according to another embodiment of the present invention.

Figure 6A:
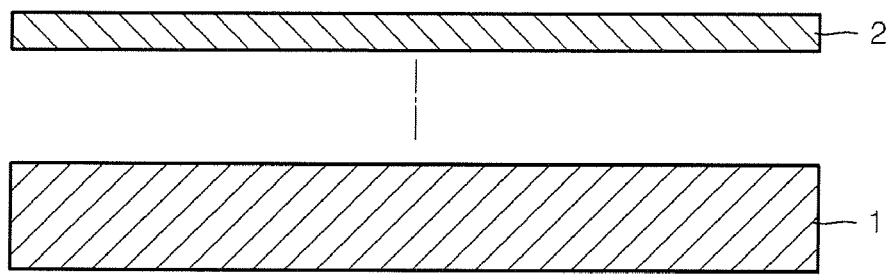
FIG. 6A through 6D are schematic cross-sectional views illustrating operations included in a method of manufacturing an electrophoretic display apparatus of FIG. 4, according to another embodiment of the present invention.

First, referring to FIG. 6A, the first substrate 1 is attached to the second substrate 2. Here, since the structure of the second substrate 2 is the same structure as that illustrated in FIG. 2, a detailed aligning operation is not required for attaching the first substrate 1 to the second substrate 2.

Figure 6B:
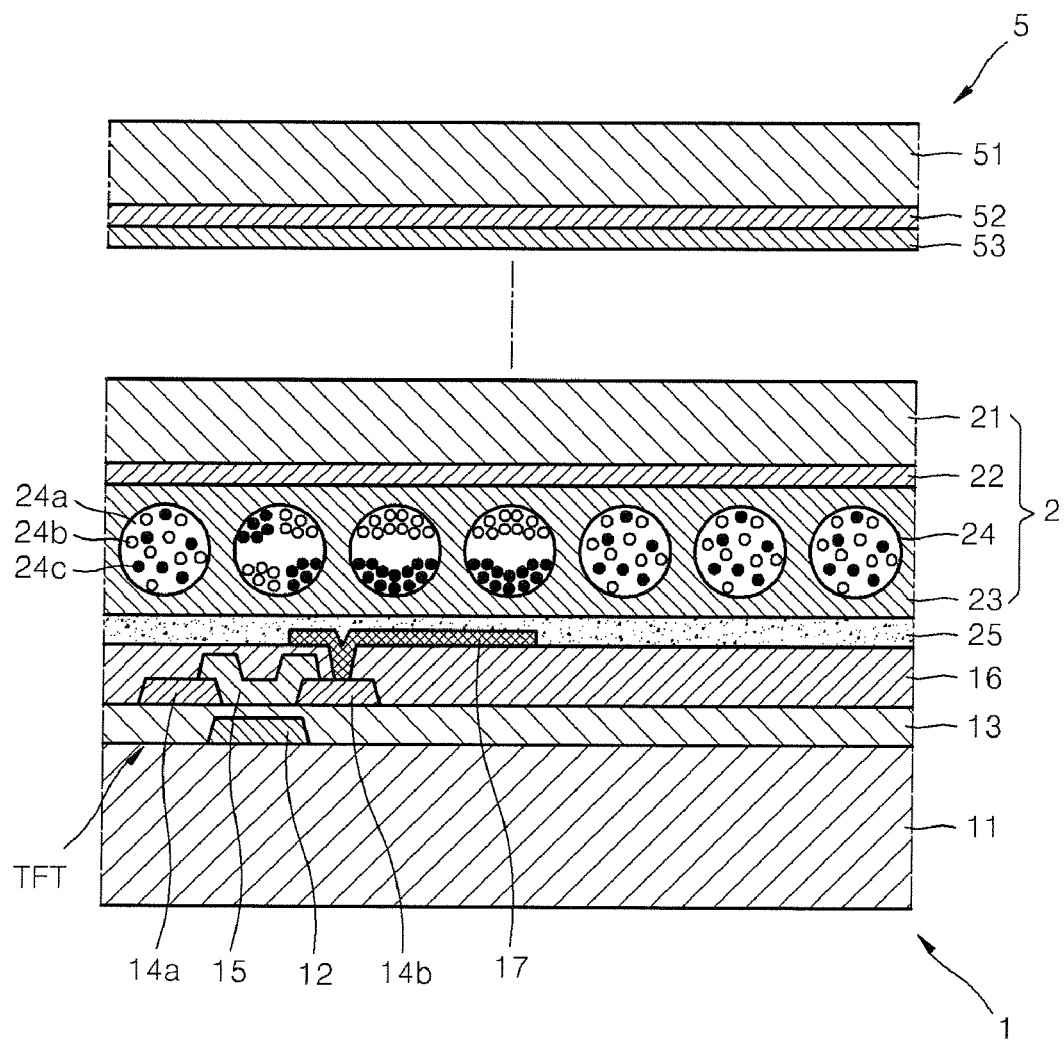

Next, referring to FIG. 6B, a donor substrate 5 is formed, and then the donor substrate 5 is positioned on the second substrate base 21. Here again, the donor substrate 5 includes a donor substrate base 51, an LTHC layer 52 and a color filter layer 53.

Figure 6C:
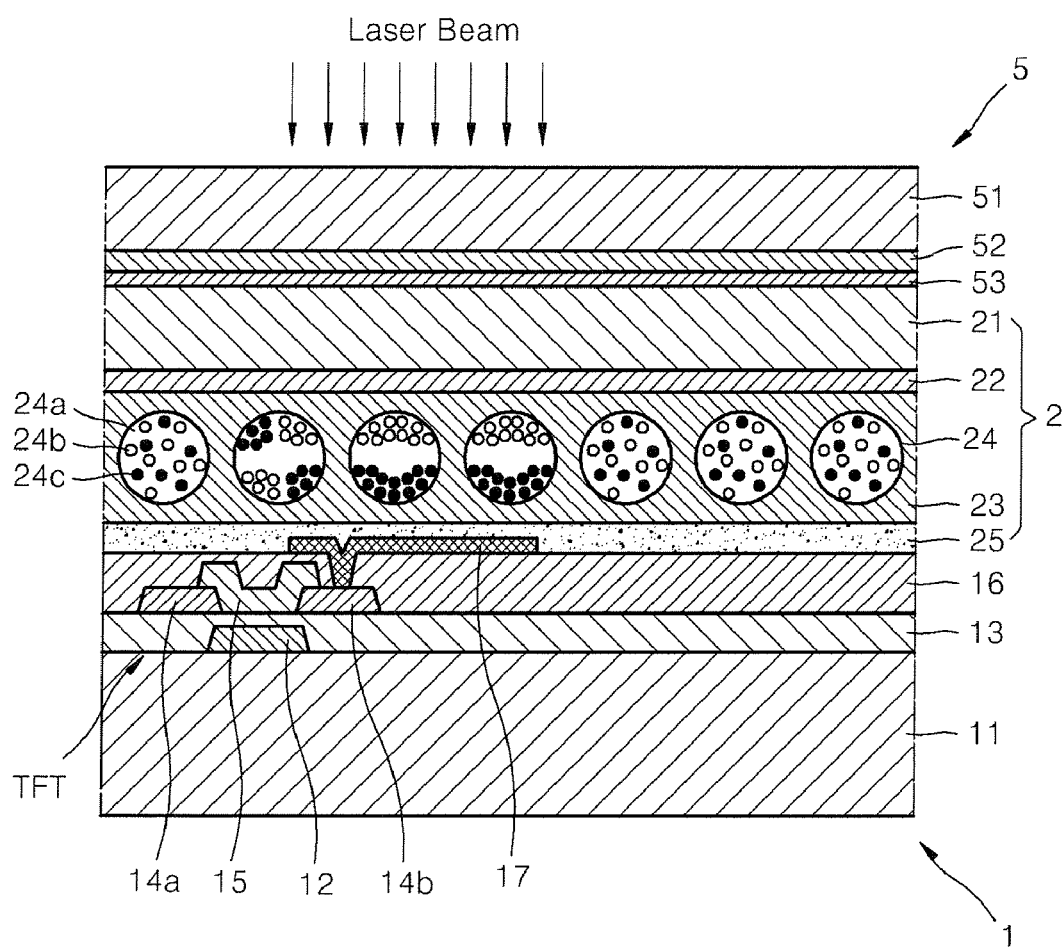

Referring to FIG. 6C, laser light is irradiated on a region corresponding to the pixel electrode 17 to transcribe the color filter layer 53 onto the second substrate base 21. As with the previous method, a plurality of color filters can be formed on the second substrate base 21 by selectively irradiating each region where a color filter is to be formed.

Figure 6D:
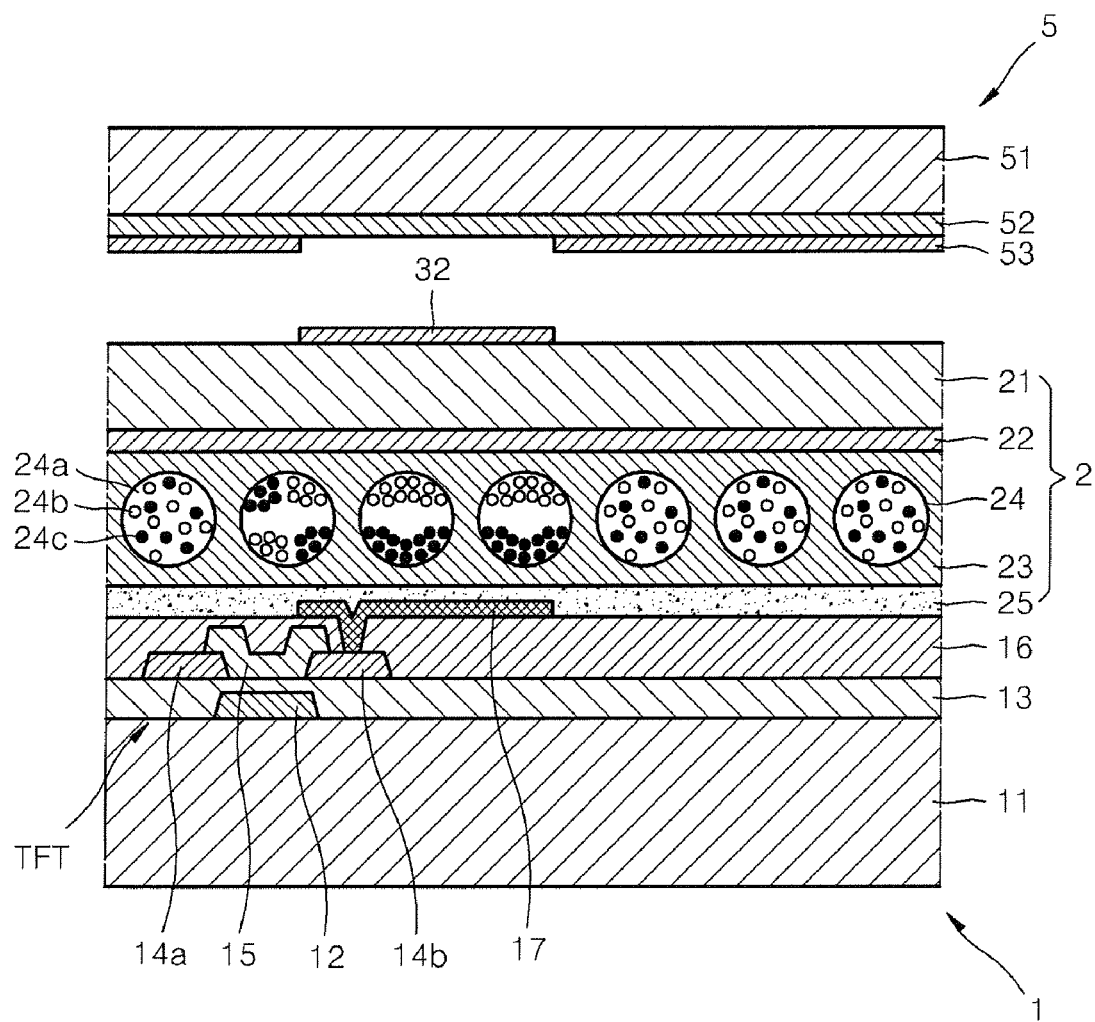

Referring to FIG. 6D, the donor substrate 5 is removed and the color filter 32 formed by the transcription of the color filter layer 53 remains on the second substrate base 21.

When it is desired to form red, green and blue color filters, such as, for example, in an electrophoretic display apparatus comprising a plurality of pixels, a separate donor substrate 5 can be prepared for each color filter material. The operations of positioning the donor substrate 5, transcribing the color filter layer 53 and removing the donor substrate 5 may be carried out separately for each color filter material so that, as a non-limiting example, all of the red filters 32a are formed, then all of the green filters 32b, then all of the blue filters 32c.

Here, since the color filters 32 are simply formed by regulating the position of the laser irradiation, the method of manufacturing the electrophoretic display apparatus can be simple, and the productivity of forming the electrophoretic display apparatus can be improved.

In the electrophoretic display apparatus according to aspects of the present invention and in the method of manufacturing the electrophoretic display apparatus according to aspects of the present invention, the following and/or other advantages can be obtained.

First, a full color electrophoretic display apparatus can be realized using a simple method.

Second, when the full color electrophoretic display apparatus is realized, the productivity of forming the full color electrophoretic display apparatus can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of manufacturing an electrophoretic display apparatus, comprising:
   preparing a first substrate comprising a thin film transistor;
   preparing a second substrate comprising electrophoretic particles and an electrophoretic dispersion medium, wherein the electrophoretic particles comprise first electrophoretic dispersion particles and second electrophoretic dispersion particles, wherein the first electrophoretic dispersion particles and second electrophoretic dispersion particles have different colors from each other and are electrically charged to have different polarities from each other;
   attaching a first surface of the second substrate to the first substrate by interposing an adhesion layer between the first substrate and the second substrate; and
   forming a color filter on a second surface of the second substrate, wherein the forming of the color filter comprises:
      preparing a donor substrate comprising a color filter material to be transcribed onto the second surface of the second substrate;
      aligning the donor substrate on the second surface of the second substrate; and
      transcribing the color filter material onto the second surface of the second substrate, and
   wherein the donor substrate further comprises a light-to-heat conversion layer and wherein the transcribing of the color filter material onto the second surface of the second substrate is carried out by irradiating a region of the donor substrate with a laser.

2. A method of manufacturing an electrophoretic display apparatus, comprising:
   preparing a first substrate comprising a plurality of thin film transistors;
   preparing a second substrate comprising electrophoretic particles and an electrophoretic dispersion medium, wherein the electrophoretic particles comprise first electrophoretic dispersion particles and second electrophoretic dispersion particles, wherein the first electrophoretic dispersion particles and second electrophoretic dispersion particles have different colors from each other and are electrically charged to have different polarities from each other;

attaching a first surface of the second substrate to the first substrate by interposing an adhesion layer between the first substrate and the second substrate; and forming a plurality of color filters on a second surface of the second substrate, wherein the first substrate further comprises a plurality of pixel electrodes, each pixel electrode being electrically connected to a thin film transistor, wherein the forming the plurality of color filters on the second surface of the second substrate includes:
   preparing a donor substrate comprising a color filter material to be transcribed onto the second surface of the second substrate;
   aligning the donor substrate on the second surface of the second substrate; and
   transcribing the color filter material onto the second surface of the second substrate to create a plurality of color filters, each color filter being aligned with a pixel electrode, and wherein the donor substrate further comprises a light-to-heat conversion layer and wherein the transcribing of the color filter material onto the second surface of the second substrate is carried out by irradiating a plurality of regions of the donor substrate with a laser.

3. A method of manufacturing an electrophoretic display apparatus, comprising:
   preparing a first substrate comprising a plurality of thin film transistors;
   preparing a second substrate comprising electrophoretic particles and an electrophoretic dispersion medium, wherein the electrophoretic particles comprise first electrophoretic dispersion particles and second electrophoretic dispersion particles, wherein the first electrophoretic dispersion particles and second electrophoretic dispersion particles have different colors from each other and are electrically charged to have different polarities from each other;
   attaching a first surface of the second substrate to the first substrate by interposing an adhesion layer between the first substrate and the second substrate; and
   forming a plurality of color filters on a second surface of the second substrate, wherein the first substrate further comprises a plurality of pixel electrodes, each pixel electrode being electrically connected to a thin film transistor,
   wherein the forming the plurality of color filters on the second surface of the second substrate includes:
      preparing a donor substrate comprising a color filter material to be transcribed onto the second surface of the second substrate;
      aligning the donor substrate on the second surface of the second substrate; and
      transcribing the color filter material onto the second surface of the second substrate to create a plurality of color filters, each color filter being aligned with a pixel electrode; and
   repeating the preparing of the donor substrate, aligning the donor substrate on the second surface of the second substrate and transcribing at least one additional time using a different color filter material.

4. A method of manufacturing an electrophoretic display apparatus, comprising:
   preparing a first substrate comprising a plurality of thin film transistors;
   preparing a second substrate comprising electrophoretic particles and an electrophoretic dispersion medium, wherein the electrophoretic particles comprise first electrophoretic dispersion particles and second electrophoretic dispersion particles, wherein the first electrophoretic dispersion particles and second electrophoretic dispersion particles have different colors from each other and are electrically charged to have different polarities from each other;
   attaching a first surface of the second substrate to the first substrate by interposing an adhesion layer between the first substrate and the second substrate; and
   forming a plurality of color filters on a second surface of the second substrate, wherein the first substrate further comprises a plurality of pixel electrodes, each pixel electrode being electrically connected to a thin film transistor,
   wherein the forming the plurality of color filters on the second surface of the second substrate includes:
      preparing a donor substrate comprising a color filter material to be transcribed onto the second surface of the second substrate;
      aligning the donor substrate on the second surface of the second substrate; and
      transcribing the color filter material onto the second surface of the second substrate to create a plurality of color filters, each color filter being aligned with a pixel electrode, and,
   wherein the preparing of the donor substrate, aligning the donor substrate on the second surface of the second substrate and transcribing are repeated such that a plurality of red color filters, green color filters and blue color filters are formed on the second surface of the second substrate.

5. A method of manufacturing an electrophoretic display apparatus, comprising:
   preparing a first substrate comprising a thin film transistor;
   preparing a second substrate comprising electrophoretic particles and an electrophoretic dispersion medium, wherein the electrophoretic particles comprise first electrophoretic dispersion particles and second electrophoretic dispersion particles, wherein the first electrophoretic dispersion particles and second electrophoretic dispersion particles have different colors from each other and are electrically charged to have different polarities from each other;
   forming a color filter on a surface of the second substrate; and
   attaching the second substrate to a surface of the first substrate by interposing an adhesion layer between the first substrate and the second substrate,
   wherein the forming of the color filter comprises:
      preparing a donor substrate comprising a color filter material;
      aligning the donor substrate on the surface of the second substrate; and
      transcribing the color filter material onto the surface of the second substrate, and
   wherein the donor substrate further comprises a light-to-heat conversion layer and wherein the transcribing of the color filter material onto the second surface of the second substrate is carried out by irradiating a region of the donor substrate with a laser.

* * * * *